Oct. 17, 1950     R. A. GARRITY     2,526,343
RECTANGULAR SPLINT BASKET
Filed Nov. 22, 1948

INVENTOR.
RAYMOND A. GARRITY
BY
*Edward H. Rumpston*
HIS ATTORNEY

Patented Oct. 17, 1950

2,526,343

UNITED STATES PATENT OFFICE 2,526,343

RECTANGULAR SPLINT BASKET

Raymond A. Garrity, Lockport, N. Y.

Application November 22, 1948, Serial No. 61,438

6 Claims. (Cl. 217—122)

1

This invention relates to splint baskets and, more particularly, to the variety of such baskets having a tapered, rectangular shape, one object of the invention being to provide an improved basket of this character having a more practical, rugged and efficient type of construction.

Another object is to supply such a basket having a reinforced and stronger construction, with substantially smooth, uninterrupted surfaces, inside and out, and with closed walls for better retention and protection of the contents.

A further object is to provide a basket of such a nature made of standard materials, economically applied, and capable of being economically manufactured.

Still a further object is to provide a basket having the above advantages in a type of construction adapted to be readily and economically manufactured by automatic basket making machinery.

To these and other ends the invention resides in certain improvements and combinations of parts, all as will be hereinafter more fully described, the novel features being pointed out in the claims at the end of the specification.

The preferred embodiment of the invention, herein disclosed by way of illustration, comprises a basket, such as the familiar bushel basket, but having an advantageous tapered rectangular shape, made with separate inner and outer series of splints, with bottom and side wall reinforcing means smoothly enclosed between the splints and with the splints of one series arranged to cover and close the joints between adjacent splints of the other series, to provide a closed and strongly reinforced structure of convenient and economical shape.

Figure 1:
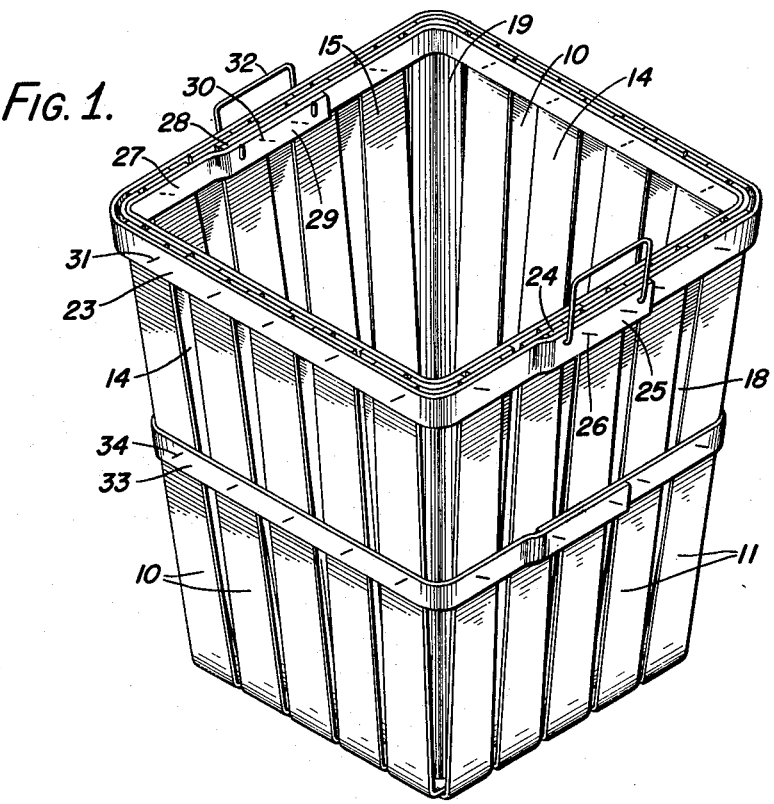
Fig. 1 is a perspective view of a basket embodying the present invention.
Figure 3:
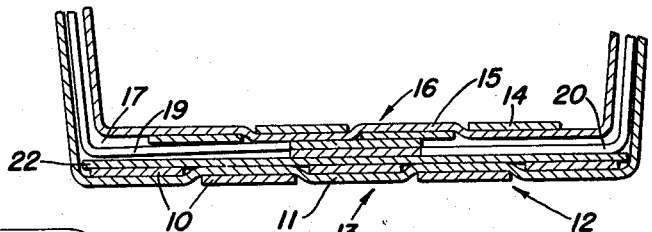
Fig. 3 is an enlarged, sectional elevation, partly broken away, on the line 3—3 in Fig. 2.
Figure 2:
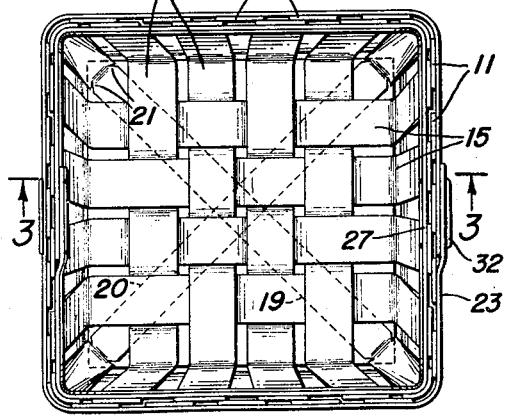
Fig. 2 is a top plan view thereof.

Referring more particularly to the drawings, the outer series of splints preferably comprises a set of five splints, as at 10, extending continuously side by side in substantially parallel relation, from the top edge of the basket at one side downwardly across its bottom and up the opposite side to the opposite top edge. A second set of five splints 11 extends transversely of the splints 10 in similar arrangement and with the central portions of the two sets of splints interwoven with one another as indicated generally at 12 (Fig. 3), to produce a substantially flat rectangular mat forming an outer bottom portion for

2 the basket of corresponding shape, as indicated generally at 13.

A separate inner series of splints is similarly formed but preferably with a somewhat lesser number of splints, comprising four splints, as 14, arranged as described above in connection with the splints of the outer series and having their central portions interwoven with a transversely extending series of four splints, as 15, to produce a substantially flat, rectangular mat, indicated generally at 16. This mat forms an inner bottom portion for the basket of corresponding shape and of slightly smaller size than the outer bottom portion, so as to leave a small space therebetween, as indicated at 17. The splints of the inner series are arranged, as shown, to overlap the splints of the outer series and cover and enclose the joints 18 between adjacent outer splints, to afford walls of closed construction adapted to retain and protect the basket contents.

Such a double series of splints produces a strong construction which is further strengthened by reinforcing means interposed between and enclosed by the two series of splints, so as to preserve substantially uninterrupted and smooth inner and outer bottom and side walls. This reinforcing means preferably comprises a pair of corner cover stays, 19 and 20, extending transversely of each other and diagonally of the mats 13 and 16 forming its outer and inner bottom portions. Each of these stays, adjacent the corners of the bottom portions, has its opposite edges notched, as at 21, to facilitate bending and is bent upwardly to lie over the joints between adjacent splints in the corners between adjacent side walls of the basket, to maintain its closed construction and further reinforce and strengthen its bottom and side walls.

A further reinforcing means is provided by a substantially rigid, rectangular, plate-like pad 22 of the known "veneer" material, for example, interposed between the inner and outer bottom mats and preferably against the bottom mat and under the stays 19 and 20, as shown. This pad affords further support for the weight of the basket contents and insures the maintenance of the basket bottom in the desired shape. The mats, stays and pad may be secured directly together by one or more staples (not shown) if so desired to increase the rigidity of the structure.

The upper ends of all of the inner and outer splints and of the stays 19 and 20 are connected and supported by hoop means comprising an outer hoop, or wood band, 23, having its ends, 24 and 25, overlapped adjacent the center of one side of the basket and secured by staples, as 26. An inner hoop or band 27 is also employed with its ends, 28 and 29, similarly overlapped adjacent the center of the opposite side of the basket and secured by staples, as 30. These hoops are both secured to each of the splints, as by the staples 31, which may extend through the hoops and the splints and be clinched on the inside of the basket, as well understood in the art. These hoops and the open top of the basket which they define have the rectangular shape shown and the basket top is preferably provided with wire handles 32 having their ends inserted through the hoops at their points of overlapping and through the interposed splints and clinched on the inside of the basket, as shown, to further secure these parts together and securely anchor the handles. An intermediate hoop or band 33 is also employed to embrace the outer series of splints intermediate the top and bottom of the basket, as shown, and is stapled through the splints, as by means of staples 34, to support the side walls at their central portions and maintain them in the desired flat shape.

The tapered rectangular shape of the basket has the advantages that the empty baskets may be compactly nested for transportation and storage, while the baskets, when filled, may be compactly assembled in juxtaposed relation with minimum waste of space between adjacent baskets. Such shape has the further advantage that the component parts are mainly connected together along straight lines or in flat planes, so as to impose minimum stresses on the staples or other securing means.

The invention provides a practical, strong and durable basket, doubly reinforced in such a manner, however, as to maintain substantially uninterrupted and smooth inner and outer basket surfaces. The component parts are of standard materials and are economically applied in an arrangement which is adapted for manufacture inexpensively by automatic basket making machinery, so as to supply a basket capable of being manufactured in quantity volume at a rapid rate of production and at low cost.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A splint basket of tapered rectangular shape comprising an outer series of splints interwoven with one another at their central portions to produce a mat forming a rectangular outer bottom portion for the basket, said outer splints being bent upwardly at an inclination at each side of said mat to form an inclined straight outer side wall, a separate inner series of splints interwoven with one another at their central portions to produce a mat forming a rectangular inner bottom portion for the basket, said inner splints being bent upwardly at an inclination at each side of said inner mat to form an inclined straight inner side wall, with the splints of said inner series covering and closing the joints between the splints of said outer series to provide a closed wall construction, reinforcing means interposed between and enclosed by said inner and outer series of splints, and rectangular hoop means connecting and reinforcing the tops of the splints of said inner and outer series to form a rectangular open top for the basket.

2. A basket as specified in claim 1 in which said reinforcing means comprises a pair of corner cover stays extending transversely of each other and diagonally of and between said inner and outer bottom portions and bent upwardly at the corners thereof to overlie the joints between the splints at the corners between adjacent side walls, with their tops secured by said hoop means, for closing said corner joints and reinforcing the basket construction.

3. A basket as specified in claim 1 in which said reinforcing means comprises a substantially rigid, rectangular, plate-like pad interposed between and enclosed by said inner and outer bottom mats for reinforcing and maintaining said bottom portions in substantially flat shape.

4. A splint basket of tapered, rectangular shape comprising an outer series of splints interwoven with one another at their central portions to produce a mat forming a rectangular outer bottom portion for the basket, said outer splints being bent upwardly at an inclination at each side of said mat to form an inclined straight outer side wall, a separate inner series of splints interwove with one another at their central portions to produce a mat forming a rectangular inner bottom portion for the basket, said inner splints being bent upwardly at an inclination at each side of said inner mat to form an inclined straight inner side wall, with the splints of said inner series covering and closing the joints between the adjacent splints of said outer series to provide a closed wall construction, a pair of corner cover stays extending transversely of each other and diagonally of and between said inner and outer bottom portions and bent upwardly at the corners thereof to overlie the joints between adjacent splints at the corners of said side walls, to cover and close said joints, and a substantially rigid, rectangular, plate-like pad interposed between and enclosed by said inner and outer bottom mats for reinforcing and maintaining said bottom portions in substantially flat condition, and rectangular hoop means connecting and reinforcing the tops of the splints of said inner and outer series and of said stays, to form a rectangular open top for the basket.

5. A splint basket of tapered, rectangular shape comprising an outer series of splints interwoven with one another at their central portions to produce a flat mat forming a rectangular outer bottom portion for the basket, said splints being bent sharply upwardly with an outward inclination at each side of said mat to form an inclined straight outer side wall, a separate inner series of splints interwoven with one another at their central portions to produce a flat mat forming a rectangular inner bottom portion for the basket, said inner splints being bent sharply upwardly with an outward inclination at each side of said inner mat to form an inclined straight inner side wall, with the splints of said inner series covering and enclosing the joints between the adjacent splints of said outer series to provide a closed wall construction, reinforcing means interposed between and enclosed by said inner and outer series of splints, inner and outer hoop bands connecting and reinforcing the tops of the splints of said inner and outer series to form a rectangular open top for the basket, and a hoop connecting and reinforcing the splints of said outer series intermediate the top and bottom of the basket.

6. A basket as specified in claim 5 in which said inner and outer hoops have their ends overlapped at the central portions of opposite side walls and wire handles for the basket have their ends inserted through said splints and said hoops including said overlapping ends thereof, to reinforce said splints and hoops and provide secure anchors for said handles.

RAYMOND A. GARRITY.

REFERENCES CITED

The following references are of record in the file of this patent:

UNITED STATES PATENTS

| Number | Name | Date |
|---|---|---|
| 450,113 | Snow | Apr. 7, 1891 |
| 1,894,236 | James | Jan. 10, 1933 |
| 1,915,227 | Hargroves | June 20, 1933 |
| 1,943,824 | Hile | Jan. 16, 1934 |